Nov. 11, 1930.  C. J. HUG  1,780,923
WHEEL
Filed Oct. 14, 1927
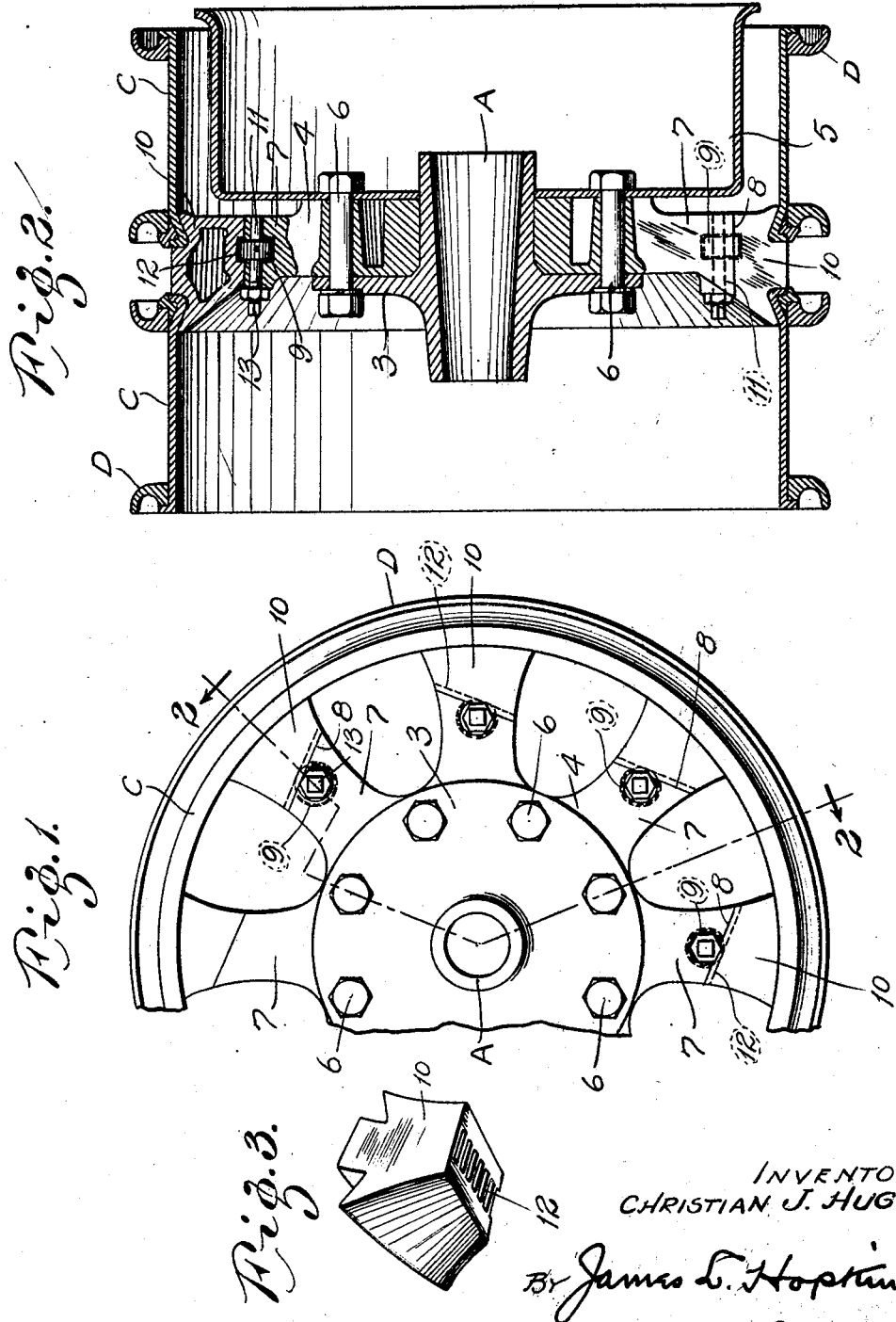
INVENTOR:
CHRISTIAN J. HUG.
By James L. Hopkins,
ATTORNEY.

Patented Nov. 11, 1930

1,780,923

UNITED STATES PATENT OFFICE

CHRISTIAN J. HUG, OF HIGHLAND, ILLINOIS

WHEEL

Application filed October 14, 1927. Serial No. 226,061.

My invention relates to improvements in wheels and consists of a spider type of wheel, having a cast hub provided with a peripheral flange arranged to detachably receive the spider member and brake-drum; the tire rim being mounted upon a spider member by means including a sufficient number of wedge-members to permit the ready withdrawal of the rim from the wheel by the removal of a sufficient number of said wedges. Such detachable mounting of said rims is effected by a pinion mounted in the spokes of the spider member, and wedge members, each provided with a rack, which are carried to and held in place by said pinions when the wheel is in assembled condition.

By the described structure I attain simplicity of operation, the simple and speedy removal of four of the wedge members usually serving to dismantle the wheel. I also accomplish the accurate alinement and balancing of the tire rim with reference to the hub. In addition to these advantages I also secure economy in manufacture and lightness in weight.

My invention is equally applicable to either single-tire or dual-tire wheels.

Drawings

In the drawings, Fig. 1 is a side elevation of a fragment of a wheel embodying my invention.

Fig. 2 is an enlarged diammetric view of the wheel, the tires being removed, taken on the line 2—2 of Fig. 1.

Fig. 3 is a perspective view of one of the wedge elements.

Description

As shown in the drawings, I employ a hub A having a peripheral flange 3 for the removable mounting of the spider member 4 and the cupped brake drum 5; these members being detachably secured together by means of bolts 6. Four or more spokes 7 of the spider member 4 are suitably beveled as indicated at 8, to slidingly receive the wedges 10, the wedges being arranged as shown in Fig. 1; their adjustment being secured by means of the pinion 9 mounted on the pin 11 and engaging the rack 12 with which the base of each of the wedges 10 is provided. The outer faces of the wedge-members 10 are suitably grooved to receive one or two tire rims C, said rims C being of usual and standard construction.

The pins 11 are mounted through the spokes 7 as shown in Fig. 2, and each pin 11 is provided with a polygonal head 13 which may be rotated by any suitable tool, such as a cupped key or a wrench.

The wedges 10 are arranged in alinement with the plane of the rim C, and in oppositely directed pairs as shown in Fig. 1.

Mode of operation

When it is desired to remove the tire or tires D, the pin 11 is rotated to unseat the wedge 10 wherewith its pinion 9 is engaged. A sufficient number of the wedges 10 being thus unseated, the rim member C with the tire or tires D mounted thereon is entirely removed from the spider member 4. The new tire or tires may then be mounted upon the rim or rims C in the usual manner, the rim C placed in position, the wedge members 10 slid into position upon the spider member 4 and then locked in position by means of the rack 12 and pinion 9.

Said wedge members, as shown, are adjustable in alinement with the periphery of the wheel.

Variations of the described and illustrated structure may be made without departure from my actual invention as defined in the appended claim.

I claim:

An improvement in wheels of the demountable rim type, comprising a spider carried on the hub and having a plurality of spokes, certain of the spokes having their outer ends formed wedge shaped circumferentially of the wheel, and alternate spokes having the wedge shaped surface extending in an opposite direction to the intervening wedge shaped ends, wedge shaped members carrying the tire rim and seated on the wedge shaped ends of the spokes, the face of the wedge shaped members facing the spokes formed with racks, and a pinion carried by each spoke engaging the racks of the several wedges to adjust the wedges on the spokes to align them with the periphery of the wheel; the alternate wedge shaped members being movable in opposite directions to similarly adjust the same thereby to prevent creeping of the rim.

In testimony whereof I have hereunto affixed my signature.

CHRISTIAN J. HUG.